Aug. 28, 1956    J. F. SHIRK    2,760,835
PISTON RING
Filed Nov. 26, 1952    2 Sheets-Sheet 1
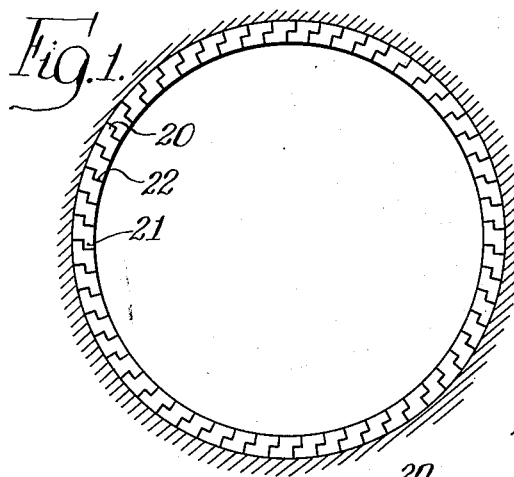
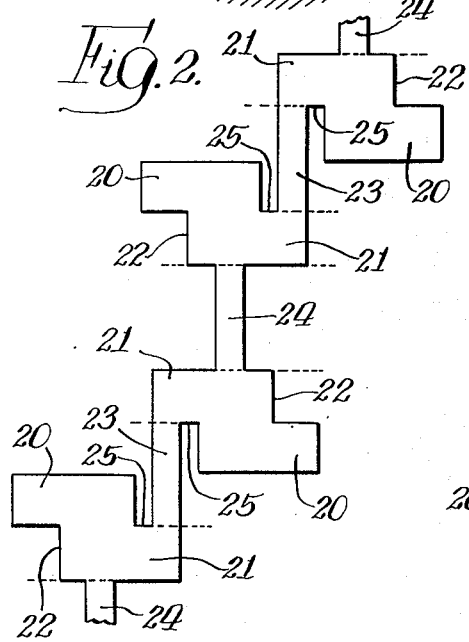
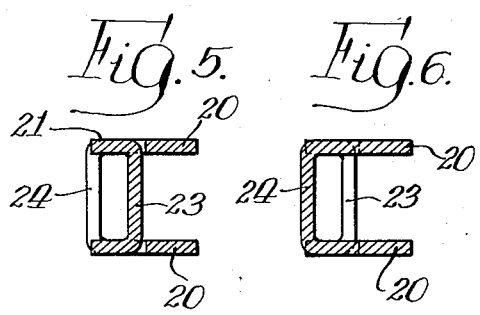
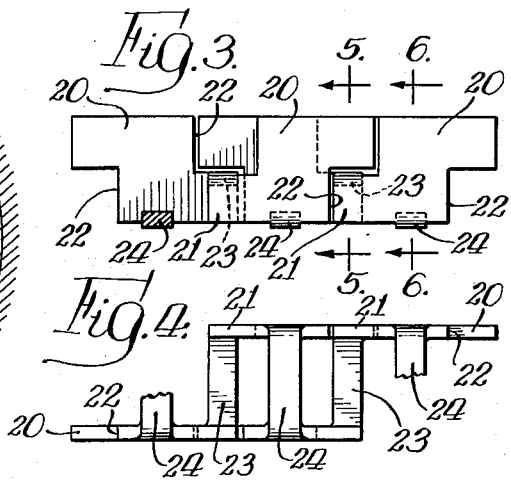
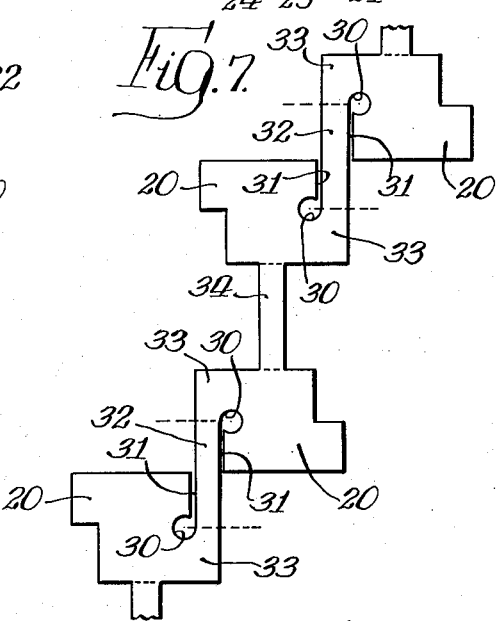
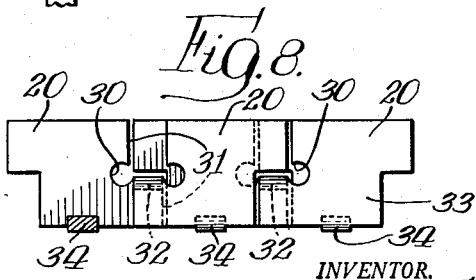
INVENTOR.
John F. Shirk,
BY Davis Lindsey Hibben & Noyes
Atty's.

Aug. 28, 1956 — J. F. SHIRK — 2,760,835
PISTON RING
Filed Nov. 26, 1952 — 2 Sheets-Sheet 2
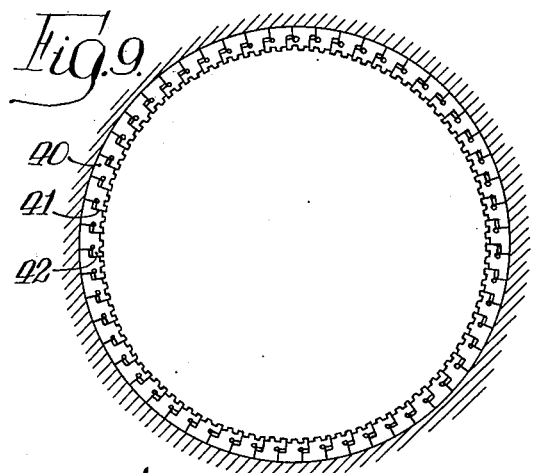
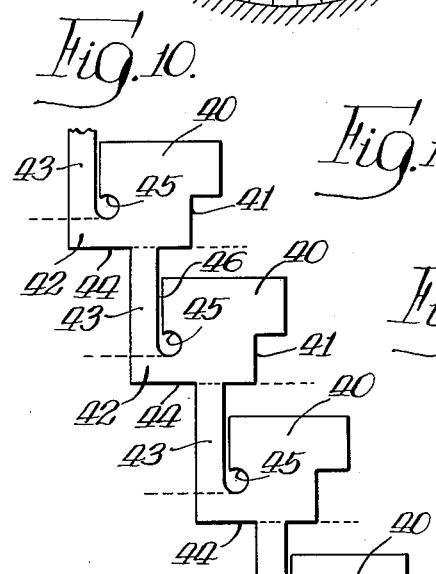
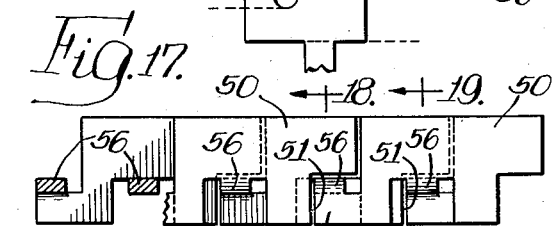
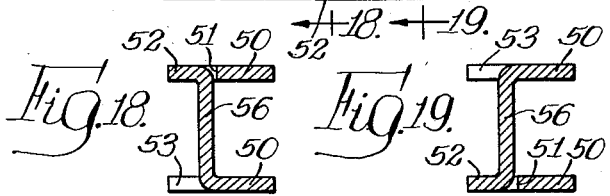
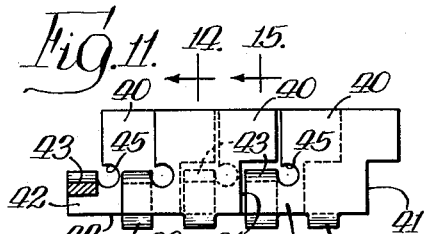
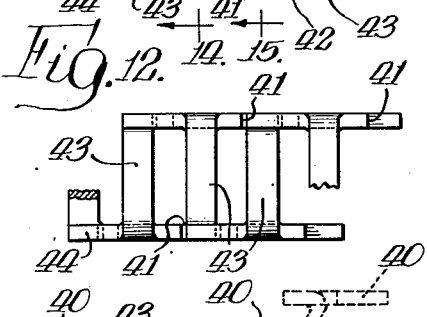
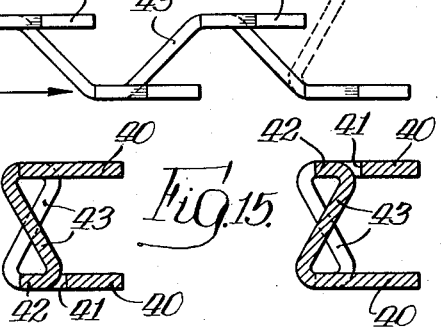
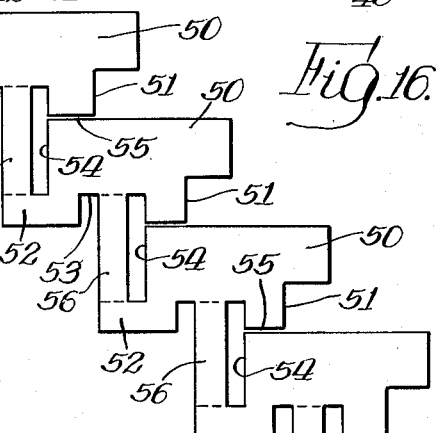
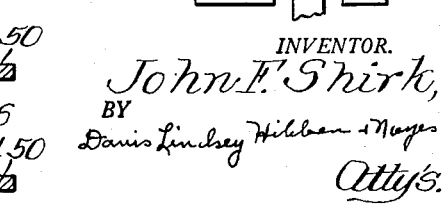
INVENTOR.
John F. Shirk,
BY Davis Lindsey Hibben & Noyes
Atty's

United States Patent Office 2,760,835
Patented Aug. 28, 1956

2,760,835

PISTON RING

John F. Shirk, Hagerstown, Ind., assignor to Perfect Circle Corporation, Hagerstown, Ind., a corporation of Indiana Application November 26, 1952, Serial No. 322,643

6 Claims. (Cl. 309—44)

The invention relates generally to piston rings and more particularly to a ring made of sheet metal.

The general object of the invention is to provide a piston ring made of sheet metal and comprising rows of segments integrally connected by a novel spring structure for expanding the ring to hold the segments individually in engagement with the cylinder wall.

Another object is to provide a novel sheet metal piston ring comprising two axially spaced rows of segments and web members extending axially of the ring, the web members providing the connection between segments in opposite rows as well as the connection between the segments of each row.

A further object is to provide a novel sheet metal piston ring comprising two axially spaced rows of segments connected by a web structure which is the equivalent of a coiled spring but is formed by a plurality of web members successively bent to extend axially of the ring.

Still another object is to provide a novel sheet metal piston ring comprising segments connected by axially extending radially facing web members alternately bent to place the segments in two axially spaced rows.

Other objects and advantages will become apparent from the following description taken in connection with the accompanying drawings, in which:

Fig. 1 is a plan view of a piston ring embodying the features of the invention.

Fig. 2 is a plan view of a strip of metal from which the ring of Fig. 1 is made and showing the manner in which the strip is punched.

Fig. 3 is a plan view of a portion of the ring after the strip has been bent but before it has been formed into a circle.

Fig. 4 is a fragmentary elevational view of the inner periphery of the ring.

Fig. 5 is a transverse sectional view taken on the line 5—5 of Fig. 3.

Fig. 6 is a transverse sectional view taken on the line 6—6 of Fig. 3.

Fig. 7 is a plan view of a strip metal for forming a modified form of ring and is similar to Fig. 2.

Fig. 8 is a plan view of a portion of the ring after the strip of Fig. 7 has been bent but before it has been formed into a circle.

Fig. 9 is a plan view of another modified form of a ring.

Fig. 10 is a plan view of a strip of metal for forming the ring shown in Fig. 9.

Fig. 11 is a plan view of a portion of the ring after the strip of Fig. 10 has been bent but before it has been formed into a circle.

Fig. 12 is a fragmentary elevational view of the inner periphery of the modification shown in Fig. 9.

Fig. 13 is a fragmentary view showing one manner of forming the ring.

Fig. 14 is a transverse sectional view taken on the line 14—14 of Fig. 11.

Fig. 15 is a transverse sectional view taken on the line 15—15 of Fig. 11.

Fig. 16 is a plan view similar to Fig. 10 but showing a strip of metal for forming another modified form of ring.

Fig. 17 is a plan view of a portion of the ring formed from the strip of Fig. 16 after the strip has been bent but before it has been formed into a circle.

Fig. 18 is a transverse sectional view taken on the line 18—18 of Fig. 17.

Fig. 19 is a transverse sectional view taken on the line 19—19 of Fig. 17.

Sheet metal piston rings of the type comprising a plurality of axially spaced rows of segments connected by web members are considered as being particularly desirable for use as oil rings because of their extreme flexibility. Such flexibility, together with the spring action tending to expand such a ring circumferentially, enables the ring to conform readily to the exact shape of the cylinder in which it operates without undue pressure. The various forms of rings disclosed herein are all of the circumferentially expansible type and each form comprises two axially spaced rows of segments connected by web members which are bent at right angles to the segments in such a manner that they produce therewith the effect of a coiled spring. The segments are preferably formed with stepped sides interfitting with corresponding sides on adjacent segments, and the web members extend generally axially from the edges of the stepped portions and from the inner edges of the segments.

In the form of ring shown in Figs. 1 to 6 and in the form of ring shown in Figs. 7 and 8, the web members extend alternately from the stepped sides of the segments and from the inner edges of the segments, and these two forms of rings are formed from their respective strips by a series of right angle bends all in the same direction. In the form of ring shown in Figs. 9 to 15 and in the form of ring shown in Figs. 16 to 19, each web member extends from a stepped side of a segment in one row to an inwardly facing edge of a segment in the other row, and the rings are formed from their respective strips by a series of right angle bends made alternately in opposite directions.

To make the form of ring shown in Figs. 1 to 6, a strip of metal, from which the ring is formed, is punched and cut as shown in Fig. 2 to provide a series of segments 20, each of which is provided with stepped sides. The stepped sides of the respective segments are so arranged that with adjoining segments in the strip, which will lie in opposite rows when the ring is formed, are of opposite hand so that the gaps between the segments in one row will be out of alignment with the gaps in the other row, as will be apparent in Figs. 3 and 4. The stepped sides of each segment provide a circumferentially extending portion 21 at the inner periphery of the ring on one side of the segment and a notch 22 on the other side of the ring at the inner periphery.

The segments are connected by web members, alternate web members being shown at 23 and the other web members being shown at 24. Each web member 23 extends from the outwardly facing edges 25 of the circumferentially extending portion 21 of the two segments connected thereby, while each web member 24 extends from the inner peripheral edges of the two segments connected thereby intermediate the sides of the segments.

With the strip punched and cut in the foregoing manner, the ring is formed by making a series of right angle bends in the strip at the points or lines where the web members connect to the segments. These bends are all in the same direction so that it results in forming two axially spaced rows of segments with the gaps between the segments in one row out of alignment with the gaps between the segments in the other row. Furthermore, this results in placing the web members 24 at the inner periphery of the two rows of segments while the web members 23 are spaced outwardly therefrom, as clearly shown in Figs. 5 and 6, since the web members 23 extend from the outer edges of the portions 21. It will also be apparent that each circumferentially extending portion 21 is positioned within the notch 22 of the adjoining segment.

With a ring constructed in this manner, the web members 23 and 24 together with the connected portions of the segments provide, in effect, a coiled spring of rectangular cross section. The diameter of the ring is such that, when it is placed in a cylinder, the ring will be compressed by moving the segments circumferentially toward each other so that the web members act in the manner of a coiled spring and tend to expand the ring circumferentially. Because of the flexibility provided by the segmental construction, the expansible pressure resulting from the action of the web members maintains the segments in engagement with the cylinder wall so that the ring radially conforms to any slight variation therein.

The form of ring shown in Figs. 7 and 8 is quite similar to the form of ring shown in Figs. 1 to 6 and comprises a plurality of segments 20 having stepped sides. Certain of the web members, however, in this form result from a slightly different method of punching and cutting the strip from that employed to form the previous form of ring, although the web members in the form of Figs. 7 and 8 extend from the segments in exactly the same manner in the finished ring as in the first described form.

To form the web members in this second form, holes are punched as at 30 at one side of the segments and shear cuts 31 are made, extending outwardly of the segments from the holes 30. These shear cuts 31 result in forming web members 32 extending from circumferentially extending portions 33 of the segments. The web members 32 occur alternately in the ring with intervening web members 34 extending from the inner edges of the segments and formed in the same manner as the web members 24 in the first form.

To form a ring from the strip shown in Fig. 7, the web members 32 and 34 are bent successively at right angles to the segments and in the same direction, just as in the first form, and a ring of substantially the same construction as the first form is thereby provided. The cross-sectional shape of the ring will be substantially the same as is shown in Figs. 5 and 6 for the first form, with the alternate web members 34 connecting the inner edges of segments in opposite rows and the other web members 32 connecting outwardly facing edges of the circumferentially extending portions 33 of segments in the two rows.

The modified forms of rings shown in Figs. 9 to 15 and in Figs. 16 to 19 are quite similar to each other and are generally similar to the rings shown in the previously described figures. The major difference between the rings shown in Figs. 9 to 19 and the rings shown in Figs. 1 to 8 lies in the manner in which the web members are connected to the segments.

In the form of ring shown in Figs. 9 to 15, a plurality of segments 40 are provided. Each segment has stepped sides providing a notch 41 at one side and a circumferentially extending portion 42 at its other side. The segments are connected together by web members 43 which are all alike and which in the finished ring extend generally axially so that each segment in one row is connected by a web member to a segment in the other row. Each web member 43 extends from the outwardly facing edge of the circumferentially extending portion 42 of a segment in one row to the inner edge, indicated at 44, of a segment in the other row. Each web member 43 is formed by punching a hole 45 in each segment and then making a shear cut 46 along the side of the segment extending outwardly from the hole 45 to sever the web member from the segment except at its end.

Fig. 10 shows a blank punched and sheared in this manner and to form the blank into a ring, the web members are bent at right angles to the segments, in opposite directions at their respective ends, to place the segments in two rows with the web members extending generally axially. In Fig. 13, I have illustrated the operation of bending the web members relative to the segments and from this figure it will be seen that, as the web members are being bent, the segments will be brought up into two axially spaced rows. In the finished ring, the segments are aligned in two rows, and the web members 43, while extending generally axially, are at a slight angle since each extends from the outwardly facing edge of the circumferentially extending portion 42 to the inner edge of a segment in the opposite row. With this arrangement, adjoining segments slant oppositely from a truly axial direction, as is clearly shown in Fig. 14.

The form of ring shown in Figs. 16 to 19 is quite similar to the form just described but the connection of the web members to the segments has been modified so that the web members extend in a truly axial direction in the finished ring. Thus, in these last mentioned figures, I provide a blank punched to form segments 50 with stepped sides providing a notch 51 at one side and a circumferentially extending portion 52 at the other side. In the inner edge of each segment, I cut a notch 53 and I also punch a series of elongated slots 54 in the blank and then make a shear cut at 55 extending from each slot 54. The shear cut 55 severs each segment from the adjacent segment, and the notches 53 and slots 54 result in providing web members 56. Each web member 56 thus extends from the outwardly facing edge of the circumferentially extending portion 52 of one of the segments to an inwardly facing edge on the next adjoining segment.

The blank is then bent along the lines where each web member 56 joins with a circumferentially extending portion 52 and along the lines where each web member joins the rearwardly extending edge on the adjoining segment resulting from the notch 53 and slot 54. The web members are thus bent at right angles to the segments, with the bending at the respective ends of each web member being in opposite directions, so that the segments are thereby placed in two axially spaced rows and the web members 56 extend in a truly axially direction as illustrated in Figs. 18 and 19.

The ring of the form just previously described as well as this form of ring are of course bent into a circle after the web members have been bent at an angle to the segments. Both of these forms of rings thus comprise two rows of segments with the segments in one row connected to those in the other by the web members. The stepped sides of the segments in both of these forms place the gaps in the opposite rows out of alignment.

With all the forms of rings shown herein, the ring is adapted to be compressed when placed on a piston within a cylinder. This results in decreasing the gaps between the respective segments and in a slight bending action in the web members edge-wise thereof so that the web members tend to expand the ring circumferentially by moving the segments apart. These rings are obviously very flexible and, with their circumferential expandability, they tend to conform closely to the shape of the cylinder.

I claim:

1. A sheet metal piston ring comprising two axially spaced rows of segments, each segment having a circumferentially extending portion, and web members integrally connected to the segments intermediate their sides and connected to said portions intermediate the inner and outer edges of the segments.

2. A sheet metal piston ring comprising two axially spaced rows of segments, and web members connecting the segments, each segment having a pair of parallel web members connected thereto for connecting the segment with a pair of segments in the opposite row, the connections of the respective web members of each pair to the associated segment being both radially and circumferentially spaced.

3. A sheet metal piston ring comprising two axially spaced rows of segments, both sides of each segment being of stepped form with the inner and outer edges of substantially equal circumferential length, and parallel web members connecting the segments in the two rows and extending axially from the inner edges of the segments and from the stepped sides thereof with adjacent web members spaced circumferentially from each other.

4. A sheet metal piston ring comprising two axially spaced rows of segments, each segment having a circumferentially extending portion at its inner periphery having an outwardly facing edge, each segment also having an inwardly facing edge, and web members connecting the segments in the two rows, each web member being connected at one end to said outwardly facing edge of said portion of a segment in one row and at its other end to said inwardly facing edge of a segment in the other row.

5. A sheet metal piston ring comprising two axially spaced rows of segments, each segment having an inwardly facing edge and stepped sides interfitting with the stepped sides of adjoining segments, one stepped side of each segment having an outwardly facing edge, and web members extending generally axially to connect the segments in one row with those in the other row, each web member extending from said inwardly facing edge of a segment in one row to the outwardly facing edge of a stepped side of a segment in the other row.

6. A sheet metal piston ring comprising two axially spaced rows of segments, each segment having an inwardly opening notch at its inner periphery intermediate its ends and having a circumferentially extending portion at one side of said notch, and web members connecting the segments in the two rows, each web member being connected at one end to a segment in one row in the notch thereof and at its other end to said portion of a segment in the other row.

References Cited in the file of this patent
UNITED STATES PATENTS

| | | |
|---|---|---|
| 2,311,731 | Bowers | Feb. 23, 1943 |
| 2,604,367 | Norton | July 22, 1952 |
| 2,631,073 | Shirk | Mar. 10, 1953 |